United States Patent [19]

Baer et al.

[11] Patent Number: 5,309,310
[45] Date of Patent: May 3, 1994

[54] COMBINED GROUND FAULT INTERRUPTER CIRCUIT AND REMOTE CONTROL ON/OFF DEVICE

[75] Inventors: Mark Baer, Linden; James M. Robitaille, Williamsport, both of Pa.

[73] Assignee: Felchar Manufacturing Corporation, Kirkwood, N.Y.

[21] Appl. No.: 918,249

[22] Filed: Jul. 23, 1992

Related U.S. Application Data

[63] Continuation-in-part of Ser. No. 823,678, Jan. 21, 1992, abandoned.

[51] Int. Cl.⁵ .................... H02H 3/16; H04B 1/16
[52] U.S. Cl. ............................................. 361/42; 361/45
[58] Field of Search ............... 361/42, 45, 46, 86; 455/353; 340/310

[56] References Cited

U.S. PATENT DOCUMENTS

| | | | |
|---|---|---|---|
| 3,614,533 | 10/1971 | Douglas et al. | 317/18 D |
| 4,057,805 | 11/1977 | Dowling | 343/225 |
| 4,063,299 | 12/1977 | Munroe | 361/45 |
| 4,124,835 | 11/1978 | Cahill, Jr. | 337/1 |
| 4,197,567 | 4/1980 | Dietz et al. | 361/45 |
| 4,301,542 | 11/1981 | Weintraub et al. | 455/353 |
| 4,306,329 | 12/1981 | Yokoi | 15/319 |
| 4,355,309 | 10/1982 | Hughey et al. | 340/825.53 |
| 4,369,543 | 1/1983 | Chen et al. | 15/319 |
| 4,386,338 | 5/1983 | Doyle et al. | 340/310 A |
| 4,518,945 | 5/1985 | Doyle et al. | 340/310 |
| 4,598,331 | 7/1986 | Legatti | 361/46 |
| 4,621,992 | 11/1986 | Angott | 417/572 |
| 4,686,380 | 8/1987 | Angott | 307/125 |
| 4,780,910 | 10/1988 | Huddleston et al. | 455/617 |
| 4,816,957 | 3/1989 | Irwin | 361/45 |
| 4,847,782 | 7/1989 | Brown, Jr. et al. | 364/492 |
| 4,935,733 | 6/1990 | Munekata | 340/825.57 |
| 4,947,278 | 8/1990 | Nichols, III | 361/46 |
| 4,959,647 | 9/1990 | Daigle | 340/825.72 |

FOREIGN PATENT DOCUMENTS

| | | | |
|---|---|---|---|
| 0445449A1 | 9/1991 | European Pat. Off. | H02J 13/00 |
| 2802787 | of 0000 | Fed. Rep. of Germany | H02J 13/00 |
| 2198614A | 6/1988 | United Kingdom | H04B 5/00 |
| 2203907 | 10/1988 | United Kingdom | H02H 3/33 |

OTHER PUBLICATIONS

Application Ser. No. 07/701,651, filed May 16, 1991, entitled "Ground Fault Interrupter Circuit with Electronic Latch".

Primary Examiner—Jeffrey A. Gaffin
Assistant Examiner—S. Jackson
Attorney, Agent, or Firm—Marshall, O'Toole, Gerstein, Murray & Borun

[57] ABSTRACT

Apparatus for remotely controlling electrical equipment includes a ground fault interrupter circuit having a selectively operable circuit breaker for connecting and disconnecting power to the electrical equipment, a transmitter for generating amplitude modulated electromagnetic radiation when it is desired to operate the circuit breaker, and a receiver responsive to the electromagnetic radiation for selectively operating the circuit breaker.

29 Claims, 6 Drawing Sheets

5,309,310

COMBINED GROUND FAULT INTERRUPTER CIRCUIT AND REMOTE CONTROL ON/OFF DEVICE

This is a continuation-in-part of application Ser. No. 07/823,678 filed Jan. 21, 1992, now abandoned.

BACKGROUND OF THE INVENTION

The present invention relates to apparatus for remotely controlling electrical equipment and, more particularly, to a combined ground fault interrupter circuit and remote control on/off device.

Remote control on/off devices for electrically powered apparatus are known. Generally, such devices comprise two units: a transmitter located remotely and a receiving unit located in the apparatus which it is designed to control. One disadvantage of such an arrangement is the requirement of providing a receiver in the apparatus being remotely controlled. This requires that the apparatus be designed with remote control as one of its objects. The corollary to this is that apparatus which has not been so designed cannot be remotely controlled. Additionally, adding a receiver to the apparatus increases its cost. For some apparatus, such as household appliances, this increase in cost could make the appliance prohibitively costly.

SUMMARY OF THE INVENTION

It is, accordingly, an object of the present invention to provide apparatus for remotely controlling electrical equipment which does not require any modification of the equipment and which enables equipment which has not been designed for remote control to be so controlled.

The foregoing and other objects are accomplished in accordance with the present invention by combining an on/off device responsive to electromagnetic radiation with a ground fault interrupter circuit.

Ground fault interrupter circuits interrupt the application of electric power to a load in response to a ground fault or similar type of circuit fault. Typically, a ground fault interrupter circuit includes a circuit breaker and a fault sensing circuit. When the fault sensing circuit senses an imbalance exceeding a predetermined magnitude between the currents in the power lines connected to the load, a fault signal is generated to open the circuit breaker and thereby disconnect power from the load.

In accordance with one aspect of the present invention, the remote on/off device includes a radio frequency transmitter for generating a remote on/off signal and a receiver responsive to the signal received from the transmitter for applying a signal to the circuit breaker of the ground fault interrupter circuit to close or open the circuit breaker.

In a preferred embodiment, the invention is employed with a ground fault interrupter of the type which is housed in the plug of the power cord. This has the advantage of providing remote on/off control to electrical apparatus without the necessity of any modifications to the apparatus itself.

Other features and advantages of the present invention will become apparent from the following description of the invention which refers to the accompanying drawings.

DETAILED DESCRIPTION OF THE PREFERRED EMBODIMENT

Figure 1:
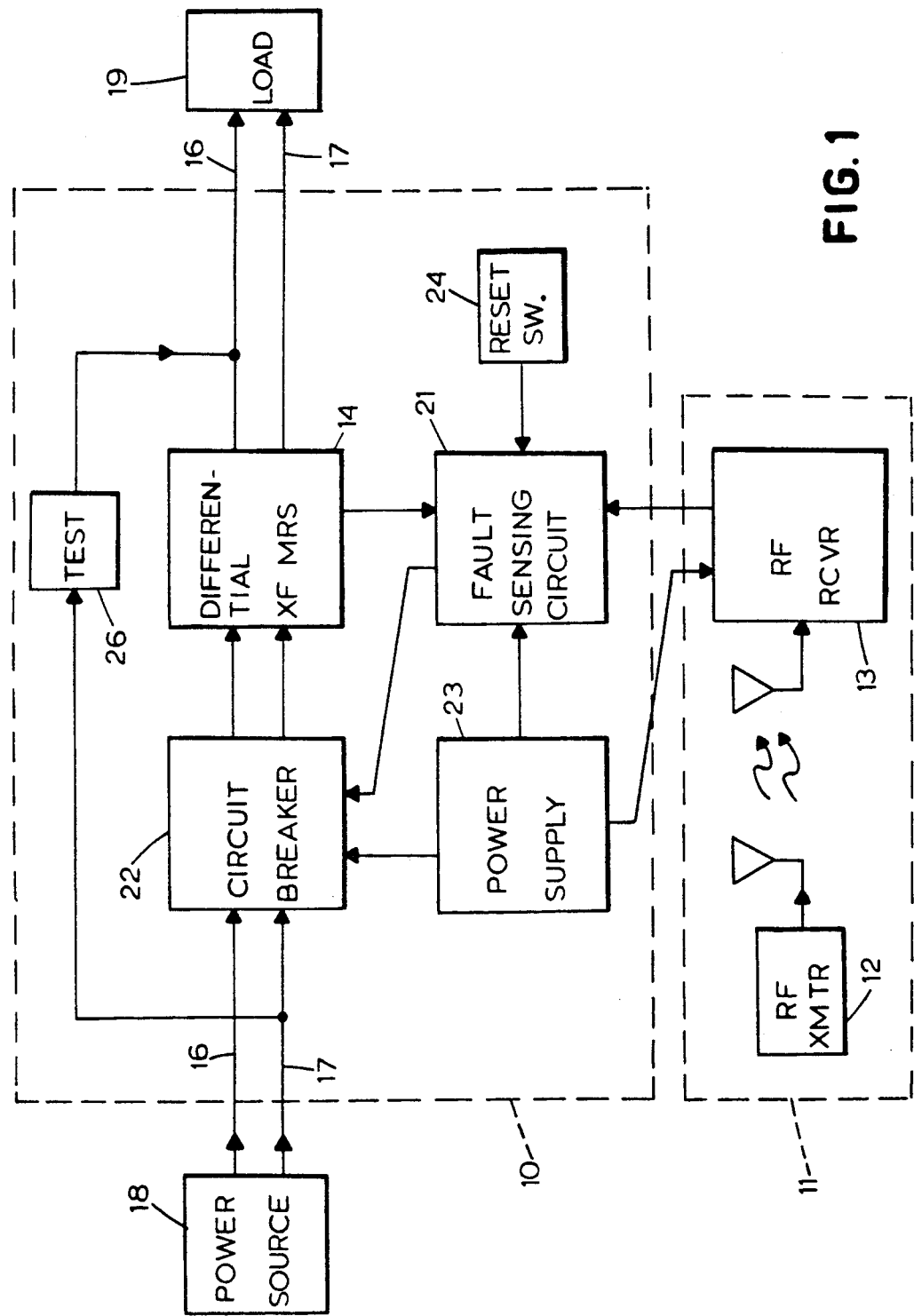
FIG. 1 is a block diagram of apparatus comprising a remote on/off device and a ground fault interrupter circuit in accordance with certain principles of the present invention.

Referring now to the drawings and, in particular to FIG. 1, there is shown a ground fault interrupter circuit 10 selectively controlled by a remote control on/off device II which includes a transmitter 12 and a receiver 13.

Typically, the ground fault interrupter circuit 10 includes one or more differential transformers 14 to monitor the current through the hot and neutral lines 16 and 17 respectively, connecting a source of AC power 18 to a load 19. Whenever an imbalance exists between the currents of the hot and neutral lines 16 and 17, the differential transformers generate a fault signal. The fault signal is typically monitored by a fault sensing circuit 21 which controls the operation of a circuit breaker 22 which, in normal operation, connects the hot and neutral lines 16 and 17 to the load 19. A typical ground fault circuit interrupter also includes an AC/DC power supply 23, a reset switch 24, and a test switch 26. In operation, when a fault, such as an imbalance between the currents in the hot and neutral lines 16 and 17 is sensed, the circuit breaker 22 is opened to disconnect the lines 16 and 17 from the load 19. After correction of the fault, the reset switch 24 is closed to apply a reset signal to the fault sensing circuit 21 to reclose the circuit breaker and reestablish connection between the source 18 and the load 19. The test circuit functions to create an imbalance between the hot and neutral lines 16 and 17 which, if the ground fault interrupter circuit is functioning normally, will create an imbalance in the differential transformers to cause the fault sensing circuit 21 to open the circuit breaker 22. While many ground fault interrupter circuits are suitable for use in practicing the present invention, a preferred ground fault interrupter circuit is illustrated in copending application Ser. No. 07/701,651, filed May 16, 1991 and entitled "Ground Fault Interrupter Circuit with Electronic Latch," the disclosure of which is incorporated by reference herein.

Figure 2:
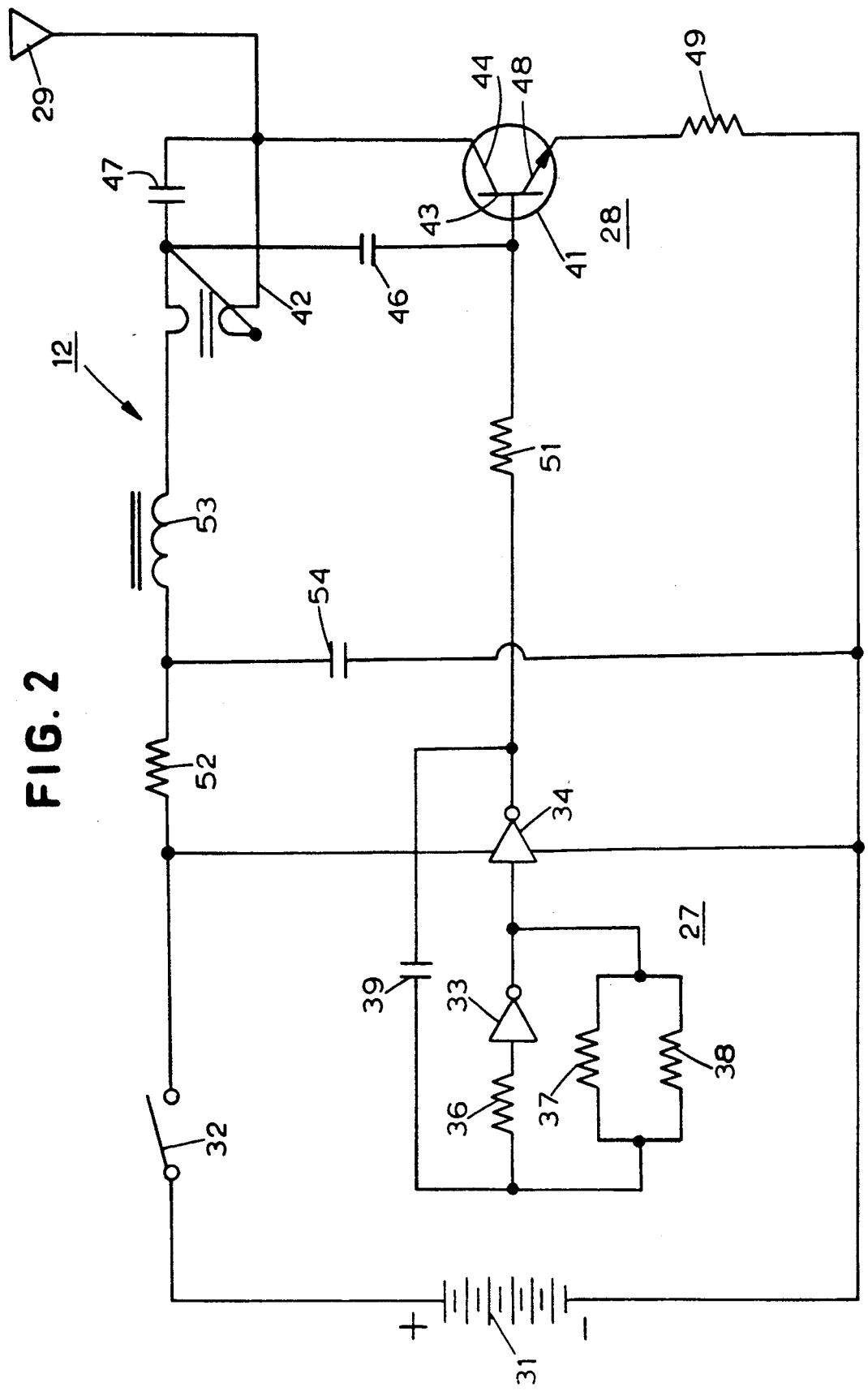
FIG. 2 is a schematic of a transmitter circuit forming part of the remote on/off device.

Referring now to FIG. 2, the transmitter 12 includes a low frequency oscillator 27 coupled to an RF oscillator/modulator 28, an antenna 29 coupled to the output of the RF oscillator/modulator 28, a power source in the form of a battery 31 and an on/off switch 32.

The low frequency oscillator 27 generates a modulating signal and includes a pair of inverters 33 and 34 interconnected with resistors 36, 37 and 38 and a capacitor 39 to form a low frequency oscillator, which typically may oscillate at a frequency of 1 kilohertz.

The RF oscillator modulator 28 functions to generate an RF carrier frequency and includes a transistor 41 and a tank circuit 42 interconnected between the base 43 and the collector 44 of the transistor along with a pair of capacitors 46 and 47. The antenna 29 is connected to the collector 44 of the transistor 41. The emitter 48 of the transistor 41 is connected through a resistor 49 to ground and the base 43 of the transistor 41 is connected through a resistor 51 to the output of the low frequency oscillator 27. DC power is supplied to the RF oscillator/modulator through a resistor 52 and a choke 53. A capacitor 54 is connected from one end of the choke 53 to ground to bypass unwanted frequencies.

The components which make up the RF oscillator/modulator 28 are selected such that the RF oscillator/modulator operates close to the low end of the AM frequency band. This enables smaller size components to be used so that the overall size of the transmitter 12 may be kept small. Typically, the frequency is in the range between 300 kilohertz to approximately 600 kilohertz. A longer wave length is used for a greater range transmission and a greater penetration of the transmitter output through objects that may lie between the transmitter 12 and the receiver 13.

When power is applied to the low frequency oscillator 27 and the RF oscillator/modulator 28 circuit by closure of the switch 32, both the low frequency oscillator and the RF modulator oscillator begin oscillating at their respective frequencies. The output of the low frequency oscillator 27, which is applied to the base 43 of the transistor 41 through the resistor 51, modulates the amplitude of the output at the collector 44 of the transistor 41 at the frequency of the low frequency oscillator. This modulated signal is then outputted from the transmitter 12 via the antenna 29. Preferably, since only a momentary burst from the transmitter 12 is necessary, the switch 32 is of the push-button type.

Figure 3A:
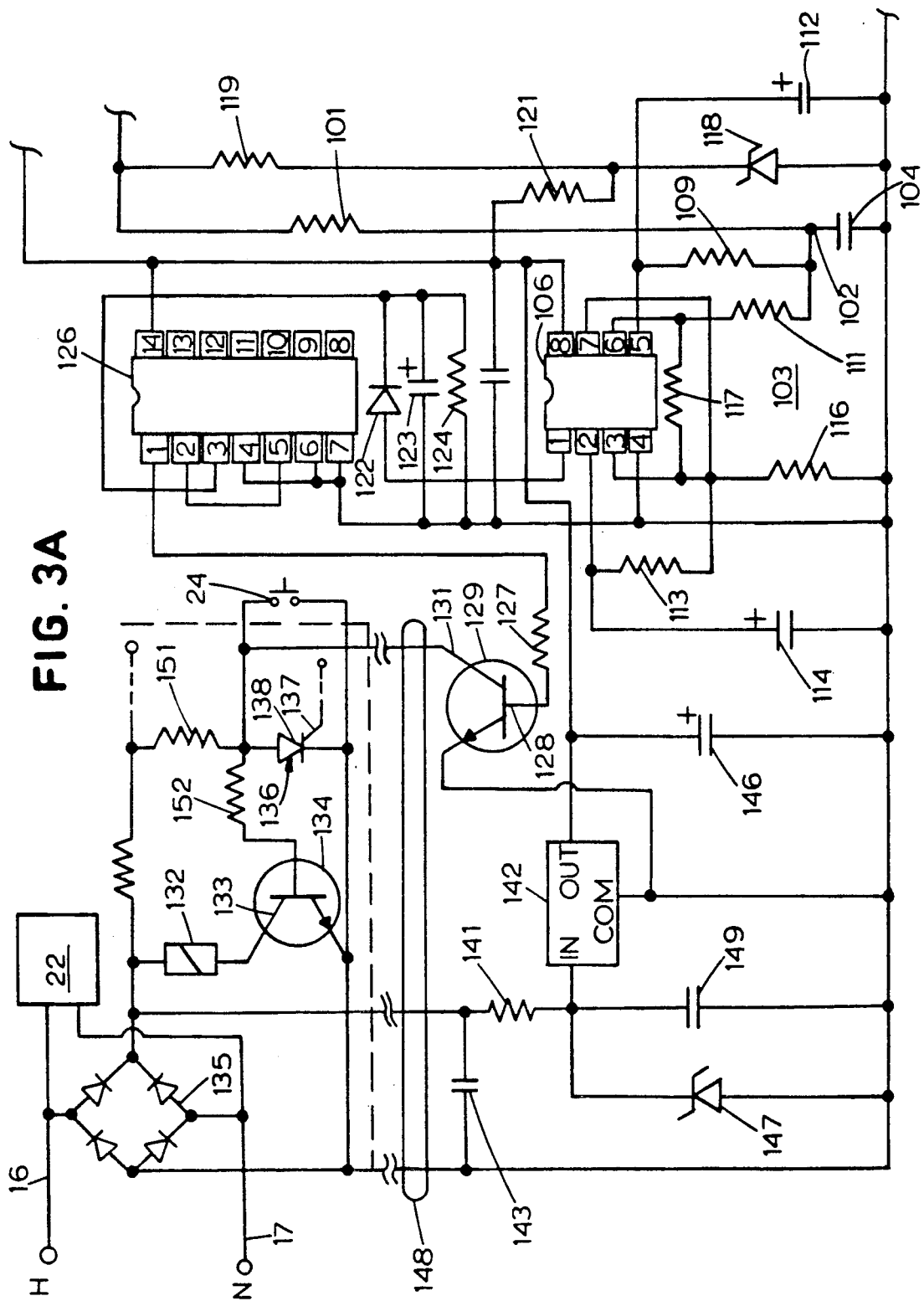
FIGS. 3A and 3B combined, with FIG. 3B to the right of FIG. 3A, illustrate schematically a receiver forming part of the remote on/off device and the interconnection of the receiver and the ground fault interrupter circuit.
Figure 3B:
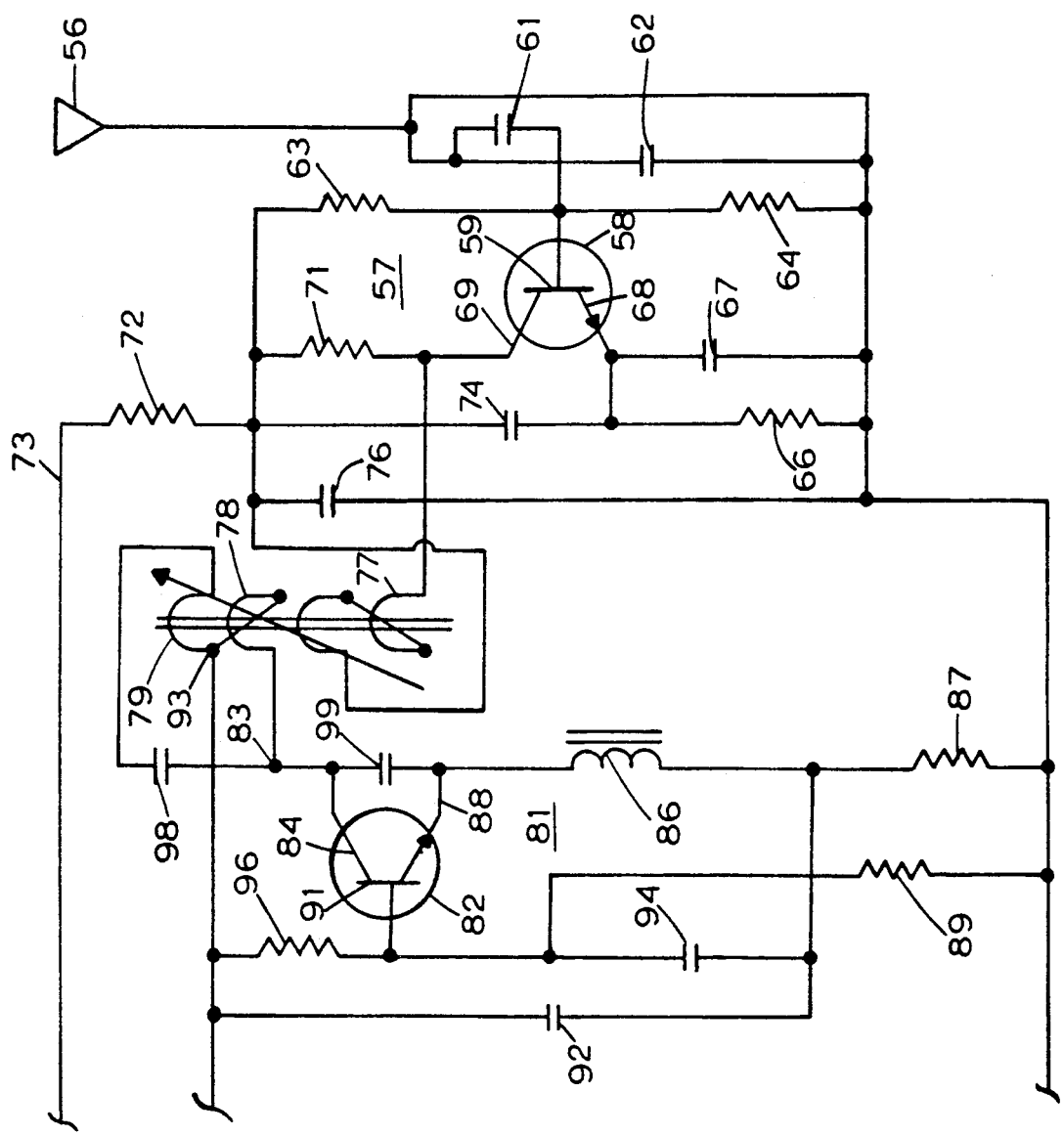

Referring now to FIGS. 3A and 3B, the receiver 13 includes an antenna 56 connected to a input RF amplifier 57. The input RF amplifier 57 includes a transistor 58 and the antenna 56 is coupled to the base 59 of the transistor 58 through a capacitor 61 and to ground or common through a capacitor 62. Also connected to the base 59 of the transistor are resistors 63 and 64. An RC circuit comprising a resistor 66 and a capacitor 67 is connected between ground and the emitter 68 of the transistor 58. The collector 69 of the transistor 58 is connected through an output resistor 71 and a resistor 72 to a DC power lead 73. Capacitors 74 and 76 are connected from the junction of the resistors 71 and 72 to the emitter 68 of the transistor 58 and to ground, respectively.

The output of amplifier 57, which appears across the resistor 71, is inductively coupled from the primary winding 77 of a tank circuit 78 to the secondary winding 79 which forms the input to a mixer/oscillator 81. The mixer/oscillator includes a transistor 82 with one end 83 of the secondary 79 of the tank circuit 78 connected to the collector 84 of the transistor 82. A choke 86 and a resistor 87 are connected to the emitter 88 of the transistor 82 and a resistor 89 is connected to the base 91 thereof to adjust the DC biasing of the transistor 82. A capacitor 92 is connected from the end 93 of the secondary 79 to the junction of the choke 86 and the resistor 87 and a capacitor 94 is connected from the junction to the base 91 of the transistor 82. A resistor 96 is connected from the end 93 of the secondary 79 to the base 91 of the transistor 82, while a capacitor 98 is connected across the secondary winding 79.

The values of the components of the mixer oscillator 81 are selected such that the oscillator oscillates at a local RF frequency which is the same as the RF frequency of the oscillator/modulator 27 and 28 of the transmitter 12. The mixer/oscillator 81 combines the locally generated RF frequency with the RF modulated signal inductively coupled from the output of the RF amplifier 57 such that the two RF signals essentially cancel one another, leaving essentially only the modulating frequency, i.e., the output of the low frequency oscillator 27 of the transmitter 12.

The output of the mixer/oscillator 81 is then applied to the input 102 of a square-wave generator 103 through a resistor 101. A capacitor 104 is connected to the resistor 101 and functions to remove any remaining RF components from the output signal of the mixer/oscillator 81.

Figure 4:
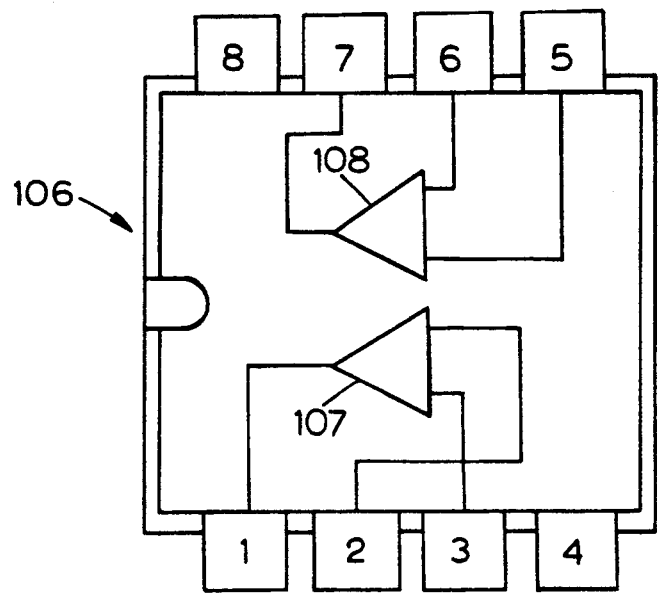
FIG. 4 is a schematic of an operational amplifier unit forming part of the receiver of FIG. 3.

The square wave generator 103 includes a dual input operational amplifier unit 106, such as a Philips ECG 358, a functional block diagram of which is shown in FIG. 4. As seen in FIG. 4, the unit 106 includes a pair of operational amplifiers 107 and 108. The operational amplifier 107 includes an inverting input at pin 2, a non-inverting input at pin 3 and an output at pin 1. The operational amplifier 108 includes an inverting input at pin 6, a non-inverting input at pin 5 and an output at pin 7. Positive DC power is applied to pin 8 and negative DC power is applied to pin 4.

Turning back to FIGS. 3A and 3B, and particularly to FIG. 3A, a resistor 109 is connected from the input 102 to the non-inverting input 5 of the operational amplifier 108 and a resistor 111 is connected from the input 102 to the inverting input pin 6 of the operational amplifier 108. A capacitor 112 is connected from the input pin 5 to ground. The output pin 7 of the operational amplifier 108 is connected to the non-inverting input pin 3 of the operational amplifier 107. A resistor 113 is connected between the inverting and non-inverting input pins 2 and 3, respectively, of the operational amplifier 107, while a capacitor 114 and a resistor 116 are connected from the input pins 2 and 3, respectively, to ground. A resistor 117 is connected between the inverting input pin 6 of the operational amplifier 108 and the non-inverting input 3 of the operational amplifier 107. A positive DC voltage is applied to the pin 8 and the pin 4 is connected to the ground. The gain of the operational amplifier unit 106 (i.e., the tandemly connected operational amplifiers 107 and 108) is set by the values of the resistors 109 and 117. A zener diode 118 and resistors 119 and 121 set the midpoint of operation of the operational amplifier unit 106.

The square wave output at pin 1 of the operational amplifier unit 106 is applied to a wave shaping circuit comprising a diode 122, a capacitor 123, and a resistor 124 which shapes the output of the operational amplifier into a trigger pulse for actuating a flip-flop 126. More specifically, the square wave output of the operational amplifier unit 106, after rectification by the diode 122, charges the capacitor 123. This provides a single trigger pulse for each train of square waves.

Figure 5:
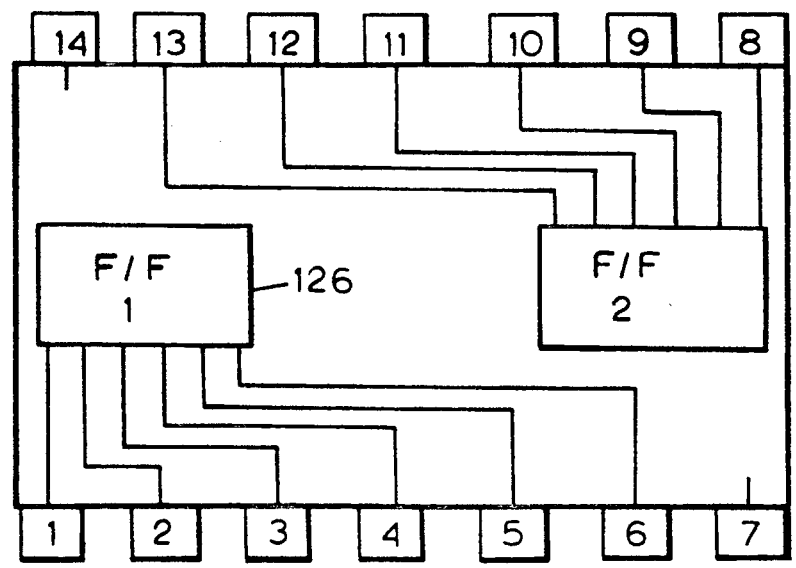
FIG. 5 is a schematic of a flip-flop forming part of the receiver of FIG. 3.

The flip-flop 126 is a D flip-flop and may be one of the dual flip-flops located on an integrated circuit, such as the National Semiconductor CD4013. Referring to FIG. 5, which is a functional block diagram of the CD4013 integrated circuit, the flip-flop 126 has a Q output at pin 1, a Q output at pin 2, a clock input at pin 3, a reset input at pin 4, a data input at pin 5, a set input at pin 6 and positive and negative power inputs at pins 14 and 7, respectively. Referring back to FIGS. 3A and 3B, and particularly to FIG. 3A, the flip-flop 126 is arranged such that the leading edge of each trigger pulse, which is applied to pin 3 (the clock input), causes the outputs of the flip-flop 126 to change state. The Q output of the flip-flop 126 at pin 1 is applied through a resistor 127 to the base 128 of an output transistor 129 connected in a common emitter configuration. The collector 131 of the output transistor 129 is connected to the ground fault interrupter circuit 10 in parallel with the reset switch 24, and like the reset switch 24, functions to control operation of the circuit breaker 22.

To better understand how this is accomplished, it is necessary to go into the structure and operation of the ground fault interrupter circuit 10 in somewhat more detail. The circuit breaker 22 is under the control of a relay 132 which, in turn, is connected to the collector 133 of a transistor 134. The transistor 134 is normally biased to conduction by current flow through resistors 151 and 152, and the relay 132 is therefore normally closed by conduction of the transistor 133. The transistor 134 is controlled by an electronic latch circuit which includes an SCR 136 which is normally off or nonconducting. When a fault is detected, a signal is applied to the gate 137 of the SCR 136 to turn the SCR 136 on. When the SCR 136 turns on, it shunts the base-emitter and base current is removed from the transistor 134, turning it off. This, in turn, de-energizes the relay 132 to open the circuit breaker 22. The voltage at this time across the SCR 136 is sufficient to keep the SCR on (i.e., latched) even after voltage is removed from the gate 137. The reset switch 24 is connected across the SCR 136 and functions to de-latch the SCR 136 by momentarily shorting it out, thereby removing current from the anode 138 of the SCR 136 to turn the SCR off. When the reset switch 24 is released, the SCR 136 will not turn on again unless a signal indicative of another fault is reapplied to the gate 137 Accordingly, when the reset switch 24 is released, base current returns to the transistor 134, thereby returning current flow to the relay 132 and again closing the circuit breaker 22.

The transistor 129 is connected in parallel with the SCR 136 and the reset switch 24, and the function of the transistor 129 is essentially identical to that of the reset switch 24. When the output transistor 129 is turned on, the SCR is shorted, removing base current from the transistor 134 to open the circuit breaker 22. When the output transistor 129 is turned off, e.g. by switching the output of the flip-flop 126 to its low state, ground is removed from the SCR 136 and base current is reapplied to the transistor 134, thereby turning on the transistor 134 and reenergizing the relay 132 to close the circuit breaker 22.

The following is a chart outlining the different modes of operation:

| Normal Operation | Fault | Reset | First Remote Control Pulse | Second Remote Control Pulse |
| --- | --- | --- | --- | --- |
| Reset switch 24 open | Reset switch 24 open | Reset switch 24 closed | Reset switch 24 open | Reset switch 24 open |
| SCR 136 off | SCR 136 on | SCR 136 off | SCR 136 off | SCR 136 off |
| trans. 134 on | trans. 134 off | trans. 134 off | trans. 134 off | trans. 134 on |
| relay 132 conducts | relay 132 non conduct | relay 132 non conduct | relay 132 non conduct | relay 132 conducting |
| breaker 22 closed | breaker 22 open | breaker 22 open | breaker 22 open | breaker 22 closed |
| trans. 129 off | trans. 129 off | trans. 129 off | trans. 129 on | trans. 129 off |

Although a separate power supply may be employed, power for the receiver is preferably obtained from the ground fault interrupter circuit 10. More specifically, the output of a full wave bridge rectifier 135 forming part of the ground fault interrupter circuit 10 is connected through a resistor 141 to the input of a voltage regulator 142, such as a Philips ECG 961. Capacitors 143, 149 and 146 are provided to filter undesirable AC components and a zener diode 147 is connected to the input of the voltage regulator 142 to limit the input voltage. The output of the regulator 142 is then applied to the power lead 73.

The receiver 13 may form an integral part of and be mounted in the same housing as the ground fault interrupter circuit 10 or, as shown be separate therefrom, in which case the receiver 13 is interconnected with the ground fault interrupter circuit by an auxiliary cable 148. Additionally, while the ground fault interrupter circuit 10 may be separately housed, it is preferably incorporated in the power plug of an electrical power cord (not shown).

The operation of the remote control on/off device 11 is described as follows in connection with remotely controlling the load 19. It is assumed that the ground fault interrupter circuit 10 and the receiver 13 are interconnected by the auxiliary cable 148, that power is applied to the ground fault interrupter circuit 10 and that the circuit breaker 22 is open, i.e., the SCR 136 is on and the transistor 134 is off.

To remotely turn on the load 19, the switch 32 in the transmitter 12 is depressed twice. The first depression causes an RF modulated signal to be sent from the transmitter 12 to the receiver 13. This then causes a square wave signal to be applied to the wave shaping circuit comprising diode 122 and capacitor 123 to generate a single trigger pulse. The trigger pulse causes the output Q at pin 1 of the flip-flop 126 to change from its low state to its high state, turning on the output transistor 129. Turning on the transistor 129 shorts the SCR 136, causing it to turn off. When the switch 32 is released, the RF signal ceases as does the output square wave from the operational amplifier. This enables the capacitor 123 to discharge through the resistor 124. It should be noted that release of the switch 32 has no effect on the flip-flop 126 since the flip-flop 126 only triggers on the leading edge of a trigger pulse. Accordingly, the flip-flop 126 remains in its high state even after the switch 32 is released. When the switch 32 is subsequently depressed, an RF signal is again generated by the transmitter 12 and converted by the receiver 13 into a square wave signal which is then shaped into a trigger pulse. The leading edge of this pulse triggers the flip-flop 126 and causes the Q output thereof to change from a high state to a low state. This turns off the output transistor 129, removing ground from the base of the transistor 134 and allowing base drive current to be restored. The transistor 134 thus turns on, thereby energizing the relay 132 to close the circuit breaker 22 and connect the source 18 to the load 19.

Thereafter, when it is desired to turn the load 19 off, the switch 32 is again depressed, thereby generating another trigger pulse and changing the state of the flip-flop 126 to turn on the transistor 129 to remove base drive from the transistor 134. The transistor 134 thereby turns off, de-energizing the relay 132 and opening the circuit breaker 22.

Figure 6:
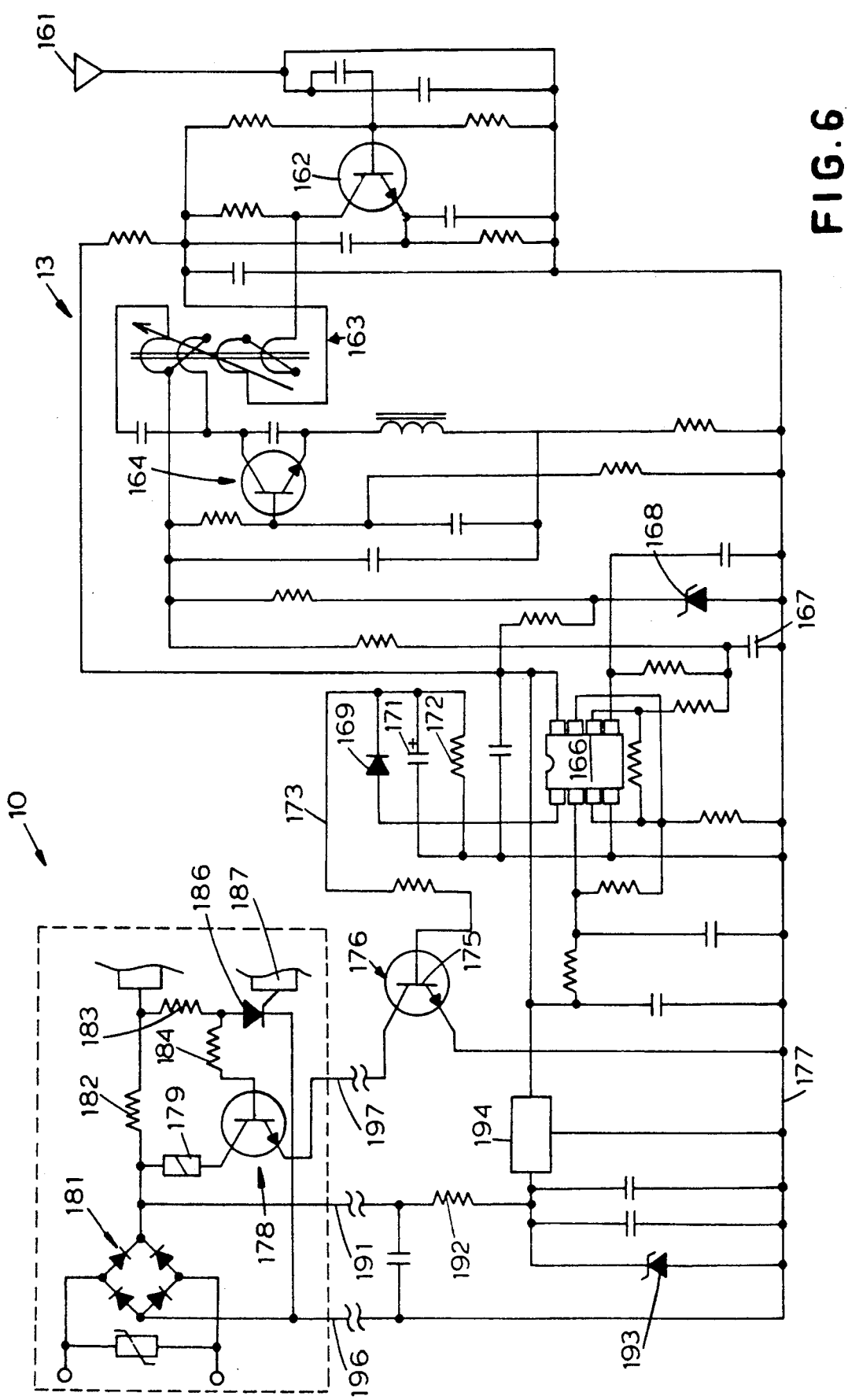
FIG. 6 is a schematic of a receiver in accordance with a preferred embodiment of the invention.

FIG. 6 shows an alternative and preferred embodiment of the receiver 13. Bursts of pulses from an RF transmitter, such as the transmitter shown in FIG. 2, are received by an antenna 161 and amplified by an RF amplifier transistor 162. The carrier frequency may be approximately 600 KHz and the modulating frequency may be approximately 1 KHz. The amplified pulse bursts are passed to a tuned circuit 163 and to an oscillator/mixer transistor 164 which operates at and removes the carrier frequency. The resulting low frequency modulating signal is fed to the input of operational amplifier (op-amp) 166. Capacitor 167 removes any remaining RF carrier frequency and diode 168 sets the zero level for the signal applied to op-amp 166. The modulating signal is amplified by amplifier 166 and then applied to diode 169, capacitor 171 and resistor 172. The signal is rectified by the diode 169 and filtered by the capacitor 171, thereby forming a positive DC voltage on an output lead 173 in response to a burst of pulses received from the transmitter 12. When the pulse burst ceases, the resistor 172 forms a discharge path for the capacitor 171, thereby setting up the circuit for the next pulse burst.

It will be readily apparent from a comparison of FIG. 6 with FIGS. 3A and 3B that the construction and operation of the portion of the receiver shown in FIG. 6 and described thus far is identical with that of the receiver shown in FIGS. 3A and 3B. Consequently, a detailed identification of the circuit components and their operation would be unduly repetitious and unnecessary.

The output lead 173 is connected to the base 175 of a transistor 176, the emitter of which is connected to a common or ground line 177. The collector of the transistor 176 is connected to the emitter of a transistor 178 (which corresponds to the transistor 134 in FIG. 3A) of the ground fault interrupter circuit 10. A relay coil 179 is connected to the collector of the transistor 178, the emitter collector circuits of the two transistors 176 and 178 thus being connected in series with the relay coil 179 between a DC power supply 181 and the common line 177.

The transistor 178 is normally biased on by current flow through three resistors 182, 183 and 184 which are connected in series between the DC supply 181 and the base of the transistor 178. An SCR 186 is connected between the common line 177 and the juncture of resistors 183 and 184, and when the SCR 186 is triggered on, it removes base current from the transistor 178. This action stops the current flow through the transistor 178 and the relay coil 179 and opens the circuit breaker. As described in application Ser. No. 07/701,651, a pulse in response to detection of a ground fault appears on a pin 187 of a controller, which triggers on the SCR 186. A reset switch (not illustrated in FIG. 6) is connected in parallel with the SCR 186.

Since the two transistors 176 and 178 are connected in series with the relay coil 179 between the DC supply 181 and common 177, the coil 179 will be energized only when both transistors are biased on. As a consequence, line power will be supplied to the load 19 only in the absence of a fault and while the transmitter is activated to radiate an electromagnetic signal which is picked up by the receiver 13 of FIG. 6. Either a ground fault or deactivation of the transmitter will stop current flow through the relay coil 179 and open the circuit breaker.

The receiver shown in FIG. 6 may be advantageously used, as an example, in a pressure washer including a hand-held nozzle or wand having a control trigger. In this example, the load 19 comprises an electric motor which powers the pump of the washer. The transmitter "on" switch would be closed by squeezing the trigger, causing the transistor 176 to turn on and current to flow through relay coil 179. Thus the motor-pump would be under the control of the trigger which operates the transmitter. The receiver shown in FIGS. 3A and 3B on the other hand is better suited for a situation wherein a load is to be turned on by pressing and releasing the transmitter switch and later turned off by pressing and releasing the transmitter switch a second time.

In the embodiment of the invention shown in FIG. 6, a three conductor cable connects the receiver to the ground fault interrupter. As a specific example, the output of the bridge rectifier 181 produces approximately 100 VDC on line 191 which is reduced to approximately 27 VDC by a resistor 192 and a diode 193. A regulator IC 194 produces approximately 8 VDC which powers the receiver components. A line 196 forms a ground or common return, and a line 197 connects the transistors 176 and 178.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Apparatus for remotely controlling electrical equipment including an electrical load and power lines for connecting the load to a power supply, said apparatus comprising:
    a) a first switch for connection in the power lines and operable between open and closed positions to control power to the load;
    b) a second switch connected to control operation of said first switch;
    c) a ground fault interrupter circuit connected to control operation of said second switch;
    d) a third switch connected to control operation of said first switch; and
    e) radiation signal responsive means for controlling said third switch.

2. Apparatus in accordance with claim 1, and further including radiation signal generator means remote from said signal responsive means for generating a radiation signal.

3. Apparatus in accordance with claim 1, wherein said radiation signal comprises electromagnetic waves.

4. Apparatus in accordance with claim 1, wherein said second switch and said third switch independently control operation of said first switch.

5. Apparatus in accordance with claim 4, wherein said second switch and said third switch are connected in parallel.

6. Apparatus in accordance with claim 1, wherein said second switch and said third switch are cooperatively connected to control operation of said first switch.

7. Apparatus in accordance with claim 6, wherein said second switch and said third switch are connected in series.

8. Apparatus in accordance with claim 1, wherein said responsive means includes means for activating said third switch in response to a first radiation signal and for deactivating said third switch in response to a subsequent second radiation signal.

9. Apparatus in accordance with claim 1, wherein said responsive means includes means for activating said third switch only while responding to a radiation signal.

10. Apparatus for remotely controlling electrical equipment, which comprises:
   a ground fault interrupter circuit having first means selectively operable for connecting and disconnecting a source of power to the electrical equipment; and
   second means responsive to electromagnetic radiation for selectively operating said first means.

11. Apparatus in accordance with claim 10, wherein said electromagnetic radiation is comprised of a carrier signal and a modulating signal and wherein said second means is responsive to the modulating signal.

12. Apparatus in accordance with claim 11, wherein said second means includes:
   third means for receiving the electromagnetic radiation and for generating a composite signal having a first component with a frequency equal to the carrier signal and a second component with a frequency equal to the modulating signal; and
   a mixer/oscillator having a local frequency equal to the frequency of the carrier signal and responsive to the composite signal for generating a demodulated signal having the same frequency as the modulating signal.

13. Apparatus in accordance with claim 12, wherein said second means further includes:
   a square wave generator responsive to the demodulated signal from the mixer/oscillator for generating a square wave output signal having the same frequency as that of the demodulated signal;
   a wave shaping circuit responsive to the square wave generator for creating a trigger pulse having a leading edge;
   a flip-flop responsive to said leading edge of said trigger pulse for changing its state; and
   an output transistor responsive to a change in the state of said flip-flop for turning on or off.

14. Apparatus in accordance with claim 13, wherein said square wave generator includes an operational amplifier.

15. Apparatus in accordance with claim 13, wherein said wave shaping circuit includes a diode for rectifying said square wave output signal of said square wave generator and a capacitor for charging to the peak value of said square wave output signal.

16. Apparatus in accordance with claim 11, wherein said first means includes:
   a circuit breaker;
   a relay for operating the circuit breaker;
   a first transistor for operating the relay; and
   an electronic latch circuit for turning said first transistor off and maintaining said first transistor off when said electronic latch circuit is latched.

17. Apparatus in accordance with claim 16, wherein said second means includes:
   fourth means for receiving the electromagnetic radiation and for generating a composite signal having a first component with a frequency equal to the carrier signal and a second component with a frequency equal to the modulating signal; and
   a mixer/oscillator having a local frequency equal to the frequency of the carrier signal and responsive to the composite signal for generating a demodulated signal having the same frequency as the modulating signal.

18. Apparatus in accordance with claim 17, wherein said second means further includes:
   a square wave generator responsive to said demodulated signal from said mixer/oscillator for generating a square wave output signal having the same frequency as that of the demodulated signal;
   a wave shaping circuit responsive to the square wave generator for creating a single trigger pulse; and
   a flip-flop responsive to a leading edge of the trigger pulse for changing its state and a second transistor responsive to a change in state of the flip-flop for turning on or off, the second transistor being connected to the electronic latch circuit such as to unlatch the electronic latch circuit when the second transistor is on to thereby allow the first transistor to turn on.

19. Apparatus in accordance with claim 18, further including a transmitter for selectively generating the electromagnetic radiation.

20. Apparatus in accordance with claim 19, wherein the transmitter includes:
   an oscillator for generating the modulating signal;
   a mixer/oscillator for generating the carrier signal and for modulating the amplitude of the carrier signal with the modulating signal; and
   an antenna responsive to the mixer/oscillator for generating the electromagnetic radiation.

21. Apparatus in accordance with claim 20, wherein the transmitter further includes a switch for applying power to the oscillator and the mixer/oscillator for an interval of time to generate a burst of electromagnetic radiation.

22. Apparatus in accordance with claim 21, wherein the means for selectively operating the connecting and disconnecting means is responsive to a single burst of electromagnetic radiation for turning off the equipment and responsive to two bursts of electromagnetic radiation for turning on the electrical equipment.

23. Apparatus for remotely controlling electrical equipment, which comprises:
   a ground fault interrupter circuit having means selectively operable for connecting and disconnecting a source of power to the electrical equipment;
   a transmitter for generating electromagnetic radiation when it is desired to operate the connecting and disconnecting means; and
   means responsive to electromagnetic radiation for selectively operating the connecting and disconnecting means.

24. Apparatus in accordance with claim 23, wherein the electromagnetic radiation is comprised of a carrier signal and a modulating signal and wherein the means for selectively operating the connecting means is responsive to the modulating signal.

25. Apparatus in accordance with claim 24, wherein the means for selectively operating the connecting and disconnecting means includes:

means for receiving the electromagnetic radiation and for generating a composite signal having a first component with a frequency equal to the carrier signal and a second component with a frequency equal to the modulating signal; and a mixer/oscillator having a local frequency equal to the frequency of the carrier signal and responsive to the composite signal for generating a demodulated signal having the same frequency as the modulating signal.

26. Apparatus in accordance with claim 25, wherein the means for selectively operating the connecting and disconnecting means further includes:

a square wave generator responsive to the demodulated signal from the mixer/oscillator for generating a square wave output signal having the same frequency as that of the demodulated signal;

a wave shaping circuit responsive to the square wave generator for creating a single trigger pulse;

a flip-flop responsive to a leading edge of the trigger pulse for changing its state; and an output transistor responsive to a change in the state of the flip-flop for turning on or off.

27. Apparatus in accordance with claim 26, wherein the square wave generator includes an operational amplifier.

28. Apparatus in accordance with claim 27, wherein the wave shaping circuit includes a diode for rectifying the square wave output signal of the square wave generator and a capacitor for charging to the peak value of the square wave output signal.

29. Apparatus in accordance with claim 28, wherein the transmitter includes:

an oscillator for generating the modulating signal;

a mixer/oscillator for generating the carrier signal and for modulating the amplitude of the carrier signal with the modulating signal; and an antenna responsive to the mixer/oscillator for generating the electromagnetic radiation.

* * * * *